United States Patent [19]

Hardwick et al.

[11] Patent Number: 4,795,882
[45] Date of Patent: Jan. 3, 1989

[54] TORCH POSITIONING APPARATUS

[76] Inventors: Steven F. Hardwick, 55 Fort Royal Ave.; Joseph V. Warren, Jr., 1721 Sulgrave Rd., both of Charleston, S.C. 29407

[21] Appl. No.: 12,436

[22] Filed: Feb. 9, 1987

[51] Int. Cl.⁴ .............................................. B23K 9/00
[52] U.S. Cl. .......................... 219/124.02; 219/121.54; 219/121.57; 219/121.48; 219/124.34
[58] Field of Search ................ 219/121 PT, 121 PU, 219/121 PV, 121 PM, 121 PC, 124.02, 124.03, 124.1, 124.34, 74, 75

[56] References Cited

U.S. PATENT DOCUMENTS

| | | | |
|---|---|---|---|
| 4,017,707 | 4/1977 | Brown et al. | 219/121 PT |
| 4,170,727 | 10/1979 | Wilkins | 219/121 PT |
| 4,284,871 | 8/1981 | Mawson | 219/121 PT |
| 4,298,784 | 11/1981 | Schmall | 219/121 PV |
| 4,324,971 | 4/1982 | Frappier | 219/121 PV |
| 4,363,468 | 12/1982 | Noe | 219/124.02 |
| 4,415,795 | 11/1963 | Ross et al. | 219/124.02 |

Primary Examiner—M. H. Paschall
Attorney, Agent, or Firm—B. Craig Killough

[57] ABSTRACT

A torch positioning apparatus controls a torch as it moves downward at a relatively rapid rate toward a work piece until it trips a proximity switch, causing the rate of travel of the torch to be slowed. The torch continues its travel until it strikes the work piece and stops, and the increase in the level of power required upon stopping is detected by a circuit which compares this increased power requirement with a power level previously measured and stored while the torch is moving, causing the direction of travel of the torch carriage to be reversed for a preset time so as to position the torch at the desired height above the work piece. A safety mechanism is included which shows the travel of the carriage in case the proximity switch fails.

11 Claims, 3 Drawing Sheets

TORCH POSITIONING APPARATUS

This invention relates generally to a positioner for positioning a torch to a desired level above a work piece, and is more specifically directed to a positioner for positioning cutting or welding torches, such as plasma arc torches, to an initially desired position and height above a work piece.

Torches are widely known and used in industry which may be positioned over sheets of metal and moved about the x and y coordinates of the plane of the sheet of metal so as to cut the sheet or sheets of metal to a desired shape, or alternatively, torches are used in a like manner for the purpose of welding metal together. Typically one or more sheets of metal is placed upon a work table, and the torch is then moved as desired to cut or weld the metal. This movement is typically powered by electro-mechanical means, and very typically, the actual direction and movement of the torch is controlled by computer through numerical control means.

After the work piece is placed upon the work table, it is necessary to position the torch to the proper work height above the work piece. It is critical for the effective use of the torch that the torch be located at an optimum height above the work piece. Particularly with plasma arc torches commonly in use, the position and height of the torch above the work piece is critical to the efficiency and efficacy of the torch. At the same time, in a production setting, it is important that the torch be moved toward the work piece as rapidly as possible while still positioning the torch to the desired height above the work piece.

Various methods are known in the prior art for initially positioning a plasma cutting torch prior to ignition of the torch. These devices include mechanical probes, switches, inductive or capacitive sensors, devices for detecting changes in gas pressure inside the torch when the nozzle is in close proximity to the work piece, and sensing the torch pilot arc current as it transfers to the work piece.

These devices have been less than desirable in actual practice. Mechanical probes are subject to damage from cutting debris and are rendered ineffective by debris accumulating on any of the parts. Inductive and capacitive probes suffer from the same problems associated with mechanical probes since they must be positioned close to the cutting operation to be effective sensors. The gas back pressure method of initial height sensing cannot be used to position the torch for underwater plasma arc cutting. Further, should pressure changes result from inputs other than the torch approaching the work piece, such as fluctuations in pressure due to improper regulation, then the torch may be improperly positioned. The pilot arc current method of sensing the work piece results in an extremely short electrode/nozzle life, which increases the cost of operation for the end user.

SUMMARY OF THE PRESENT INVENTION

The present invention positions the torch to a desired level above the work piece before the cutting arc is ignited. The torch is moved from its uppermost position at the initiation of a cycle and proceeds down toward the work piece at a relatively rapid rate, such as one hundred fifty inches (150") per minute. As the torch approaches the work piece, a proximity switch which is located inside the unit is activated, controlling the downward velocity of the torch so as to drastically slow the rate of travel toward the work piece. When the torch contacts the work piece, its travel is stopped by the contact, and a circuit detects that the power required by the motor has increased over the amount of power which was required during the slow movement of the torch. Upon the circuit detecting the increased power level requirement, the circuit reverses the direction of travel of the torch for a predetermined time and then stops the travel of the torch. The torch is now positioned to the desired height above the work piece.

The present invention provides a means for initially positioning a torch above a work piece without the problems associated with the devices in the prior art. The present invention requires no external probes or wires or sensors. It is not necessary to ignite the torch until the torch is positioned which increases safety, nor is the torch position subject to undesired changes in gas back pressure. Electrodes and nozzles experience longer life since it is not necessary to ignite the torch until it is properly positioned.

An additional feature of the device is a safety counter circuit which all change the speed of the torch to the slower speed should the proximity switch control circuit fail for any reason. This safety counter circuit actuates after a predetermined time from the beginning of the cycle if the proximity switch has not slowed the torch. The safety counter circuit knows the amount of time from prior cycles that it should take for the proximity switch to slow the torch, and if the proximity switch and corresponding circuit fail to do so, the safety counter circuit will engage to slow the rate of travel of the torch towards the work piece. This prevents the torch from crashing into the work piece at a rapid rate of speed even in the event of failure by the proximity switch.

DETAILED DESCRIPTION OF THE PREFERRED EMBODIMENT

Figure 2:
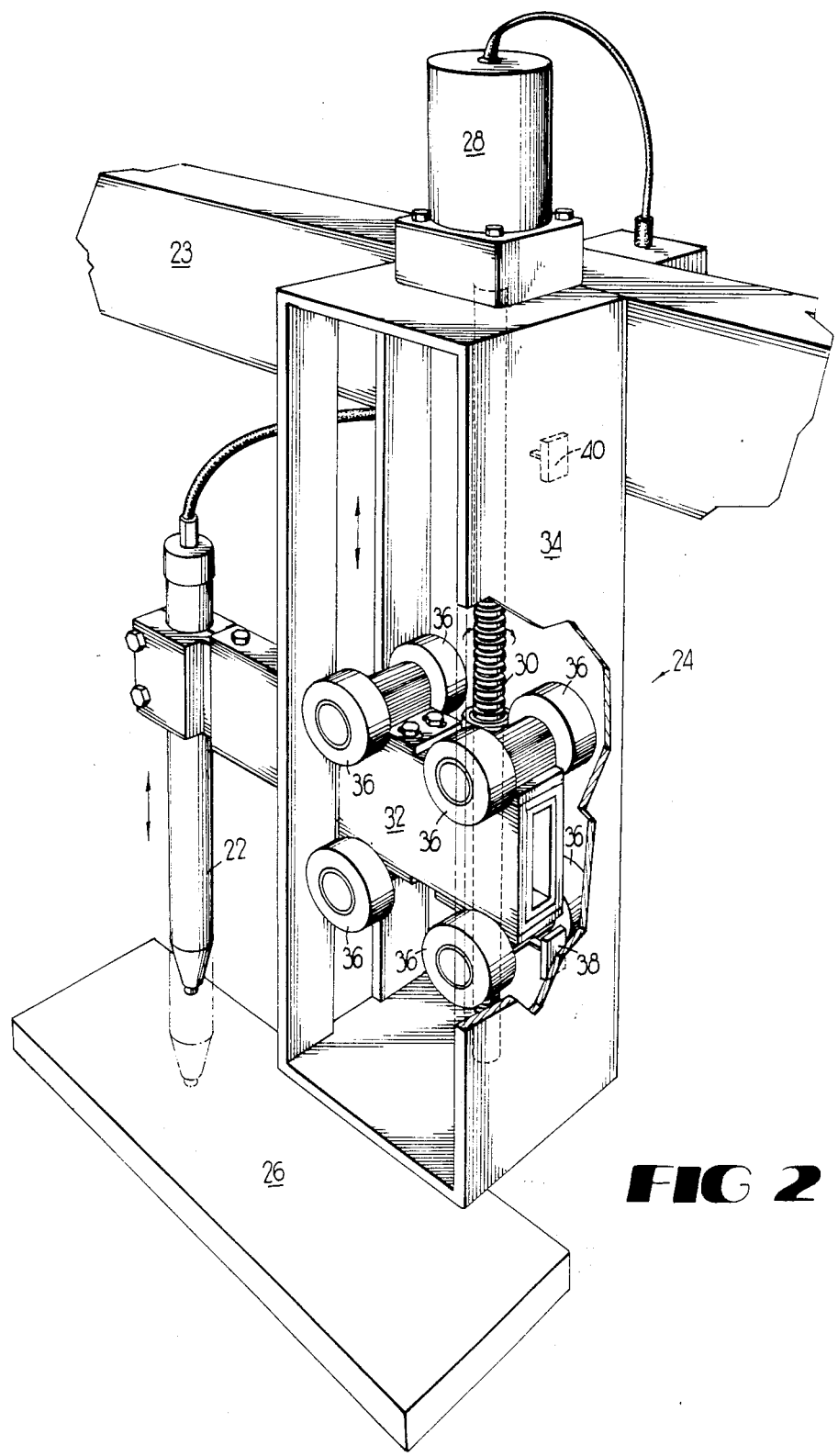
FIG. 2 is a perspective view of the torch as it is positioned above a work piece, with a housing of the torch being partially cut away so as to reveal the means of moving the torch.

FIG. 2 shows a plasma arc cutting torch 22 mounted within the torch positioning device 24. The torch positioning device 24 is mounted 23 so that it may be moved along the x-y coordinates (plane) of the work piece 26 by other control means which are known in the art and are not, with particularity, relevant to this invention.

A direct current motor 28 is located on top of the housing. A lead screw 30 is operated by the motor 28. As the motor is actuated, the lead screw turns so as to move the carriage 32 upward or downward within the enclosure 34, according to the rotational direction of the motor 28 and lead screw 30. The torch 22, which is mounted in a fixed manner at an end of the carriage 32 which is external to the enclosure, accordingly moves up and down in conjunction with the movement of the carriage 32.

Location and movement of the carriage 32 within the enclosure is aided by means of four bearings 36 which are mounted to the carriage 32 and which bear and roll against the inside surfaces of the enclosure 34.

To begin the operational cycle, the operator actuates the motor 28 which turns the lead screw 30 so as to move the carriage 32 and torch 22 in a downward direction toward the work piece 26. The motor 28 turns initially with relatively high revolutions per minute (r.p.m.) resulting in a relatively rapid rate of travel of the torch toward the work piece 26. In the preferred embodiment, this rapid rate of travel is a velocity of one hundred fifty inches (150") per minute. As the carriage 32 reaches a certain point within the enclosure, it activates a proximity switch 38 which is located within the enclosure 34. As will be seen, this proximity switch 38 then signals the motor 28 to operate at a slower speed so as to move the torch 22 the last half inch or so toward the work piece 26 at a slower rate, which in the preferred embodiment is a velocity of twenty inches (20") per minute. After the torch 22 has completed its work, the direction of the motor 28 is reversed and the carriage 32 and torch 22 are retracted upwardly and away from the work piece 26, with the carriage travelling upward until it activates proximity switch 40 to deactivate the motor.

Figure 1:
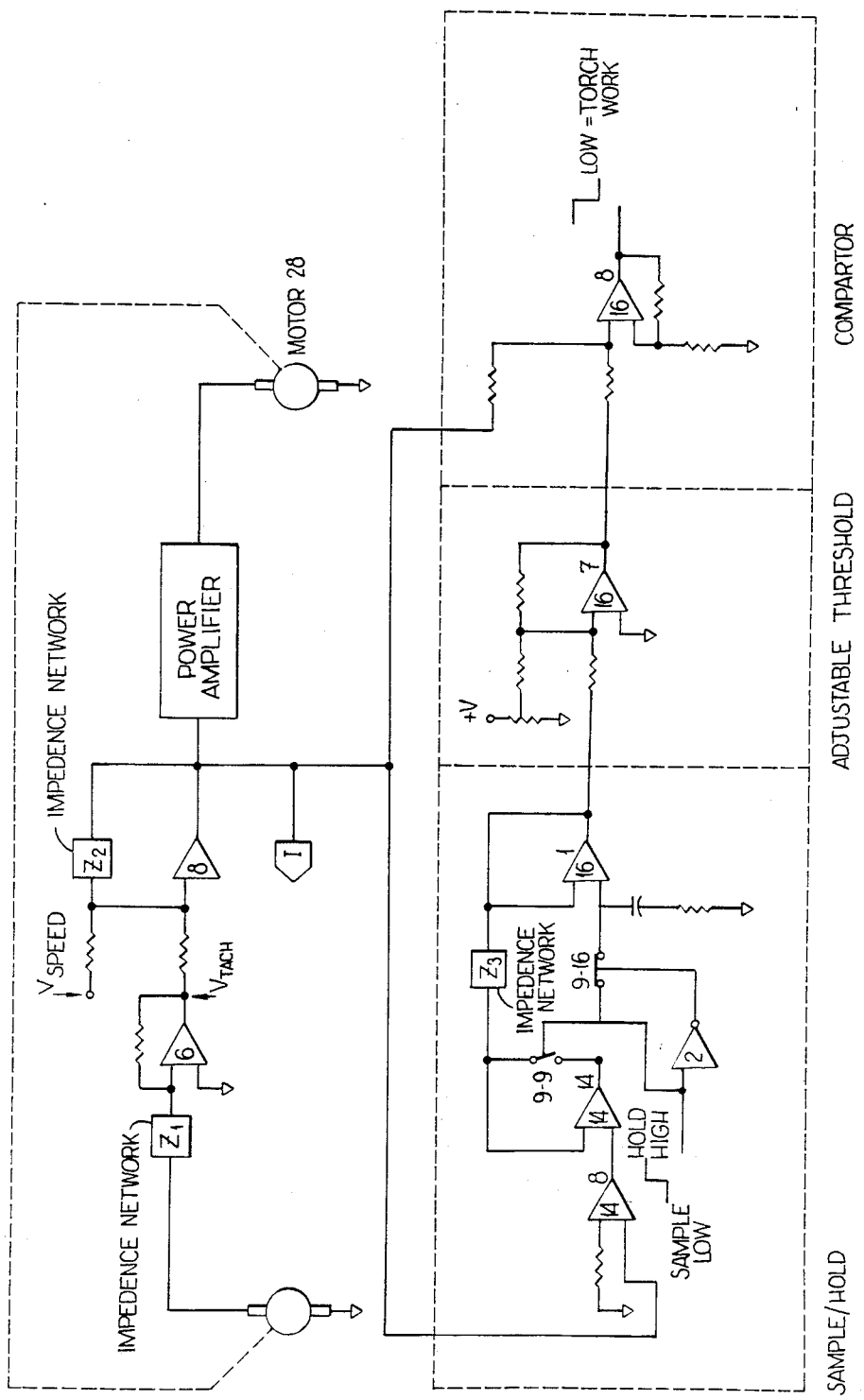
FIG. 1 is a schematic diagram showing the control means for positioning the torch.

Turning now to FIG. 1, the motor speed control that provides the slower "inching" speed is a servo control loop that is comprised of the motor 28, a tachometer (the tach provides a voltage proportional to speed), a tachometer conditioning amplifier IC6, an error amplifier IC8 and a power amplifier to drive the motor 28.

The error amplifier IC8 compares the desired speed ($V$ speed) to the actual speed ($V$ tach) and provides an output that produces the desired motor speed. FIG. 1.

When the torch 22 is approaching the work piece 26 at slow speed, the output of IC8 is sampled by IC14-8, IC14-14, switches IC9-9 and IC9-16 and IC16-1 which comprises a sample and hold circuit. IC8's output or the average power level required by the motor 28 in slow inch down is sampled then held when IC2 changes states (IC2 is controlled by the logic circuitry). The output at IC16-1 which is now being held represents the average power to "inch" down.

IC16-7 sets the power level threshold. It takes the sampled value being held and adds a predetermined voltage level to the sampled value ($V$ added) thus a threshold level is set. This predetermined voltage level is in the range of 1-2 volts and is directly related to the force developed between the torch and work piece.

IC16-8 compares the actual voltage level to the threshold level set by IC16-7. Thus while the torch 22 is inching toward the work piece 26 the threshold level is higher than the actual voltage level. When the torch makes contact with the work piece, IC8 increases the voltage level above the threshold because the motor 28 has slowed down. IC16-8 now provides a signal indicating the threshold has been exceeded. The logic circuitry stops the motor 28 then reverses the direction of motor 28 for a predetermined period of time to retract the torch 22 and position it just above the work piece 26. A potentiometer may be used to allow the retraction period to be adjusted or varied by the user so as to position the torch to the desired height.

Figure 3:
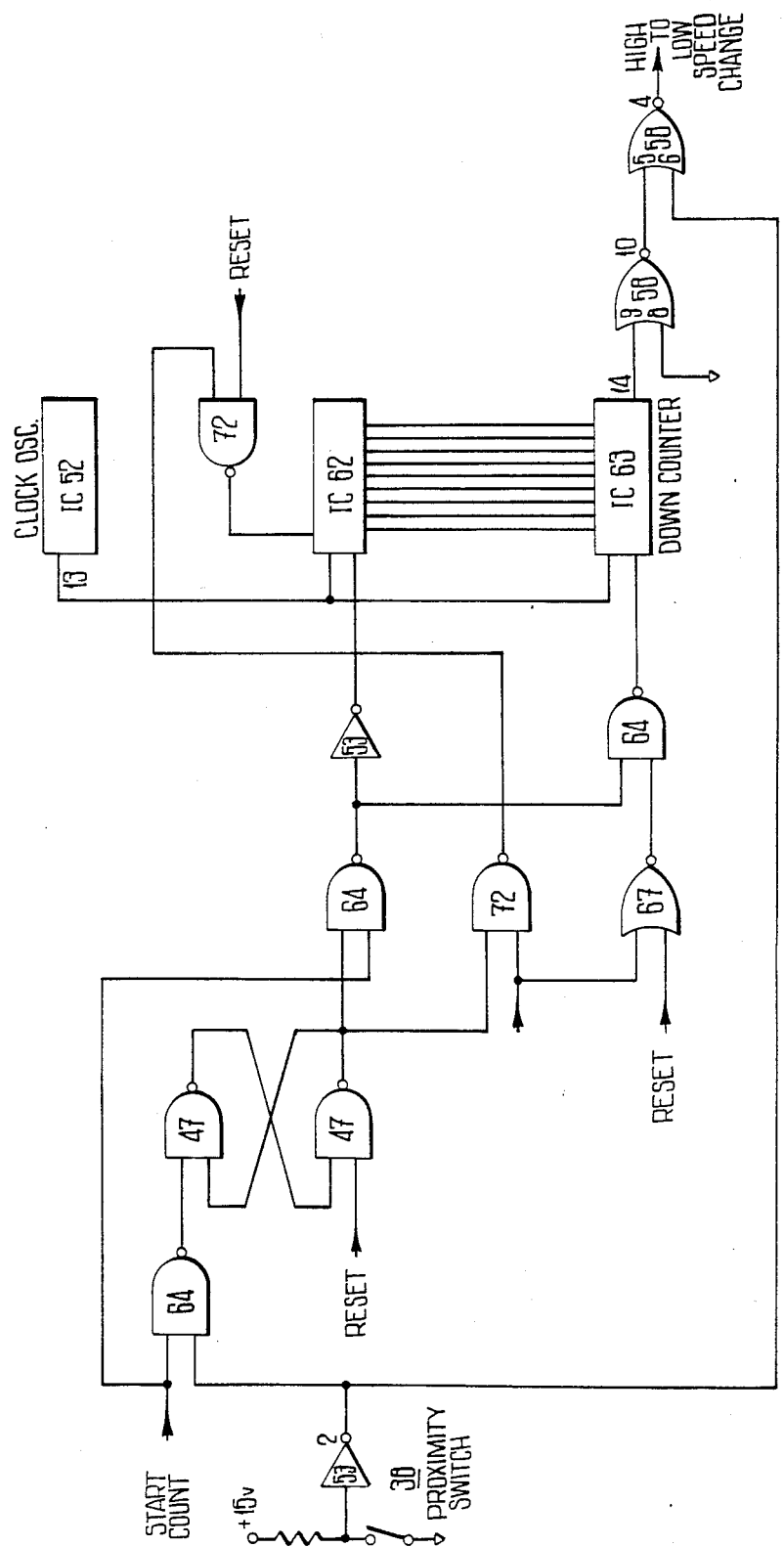
FIG. 3 is a schematic diagram of the safety counter circuitry.

The safety counter circuitry is shown in FIG. 3. This circuit initiates the change from the high, or rapid rate of travel of the torch (such as 150 IPM), to the slow rate of travel (such as 20 IPM) if the proximity switch 32 or its corresponding circuits and devices located on the positioning device should fail, so as to prevent the torch from crashing into the work piece.

The safety count for the counter is established the first time the carriage 32 moves from the uppermost position to the proximity switch 38, which initiates the high-to-low speed change. This count is held in IC62 and is established by a clock signal of IC52-13. IC63 is "loaded" with this safety count from IC62 each time thereafter that the positioning starts the move from the uppermost position to the lower proximity switch. IC63 is a down counter. If IC63 reaches a count of zero and the external proximity switch 38 has not been activated for any reason, IC63-14 in conjunction with gates IC58-10 and IC58-4 will initiate the high-to-low speed.

Normal activation of the high-to-low speed change occurs when the external proximity switch 38 closes causing IC53-2 to change states, thus causing IC58-4 to change states. So, if proximity switch 38 should fail, down counter IC63 which has the safety count will cause the high-to-low speed change and thus prevent the cutting torch 22 from impacting the workpiece 26 at high speed. The other logic gates shown in FIG. 3 are necessary for resetting and starting the count sequence.

The torch incorporated in the device can be any known torch, and the carriage and means for positioning the torch and carriage as shown in FIG. 2 can be any known means. This invention could be applied to any known torch which is positioned by an electric motor and in which the torch may be moved downwardly so as to impinge upon the work piece.

What is claimed is:

1. A torch positioning apparatus, comprising:
   a. a torch means;
   b. means for moving said torch toward a work piece;
   c. means for detecting when said torch is near said work piece which slows the travel of said torch as the torch approaches said work piece;
   d. means for detecting when said torch has contacted said work piece;
   e. means for retracting said torch to a desired level above said work piece in response to said torch contacting said work piece; and
   f. a safety counter which slows the travel of said torch toward said work piece after a predetermined time in case of failure of said means for detecting when said torch is near said work piece.

2. A torch positioning apparatus as described in claim 1, wherein said safety counter means comprises a counter which measures and stores an elapsed time of movement of said torch from its uppermost position to the actuating of the proximity switch and compares said elapsed time so shared with an elapsed time during a subsequent cycle so that if said proximity switch has failed to cause the rate of travel of said torch on said subsequent cycle to be slowed within the stored elapsed time, said counter will cause the rate of travel of said torch to be slowed.

3. A torch positioning apparatus, comprising:
   a. a torch means;
   b. an electrically powered means of moving said torch toward a work piece;
   c. a proximity switch means which detects when said torch has reached a predetermined height above said work piece and which controls said electrically powered means so as to slow the rate of movement of said torch toward said work piece;
   d. means for detecting an increase in the level of power required by said electrically powered means upon said torch impinging said work piece, which causes said power means to reverse the direction of said torch and to retract said torch to a predetermined height above said work piece in response to said increase in the level of power required by said electrically powered means; and e. a safety counter which slows the travel of said torch toward said work piece after a predetermined time has elapsed so as to prevent said torch from striking said work piece at a rapid rate of speed should such proximity switch means fail.

4. A torch positioning apparatus as described in claim 3, wherein said means for detecting an increase in the level of power required by said electrically powered means comprises:

a. circuit means for detecting a level of power required by said electrically powered means during the slow rate of movement of said torch towards said work piece;

b. circuit means for setting a threshold power level which is equal to a power level setting required by said electrically powered means during said slow rate of movement plus a predetermined power level; and c. circuit means for comparing said level of power detected by said electrically means during said slow rate of movement of said torch towards said work piece with said threshold power level such to reverse said electrically powered means so as to position said torch to a predetermined height above said work piece.

5. A torch positioning apparatus as described in claim 3, wherein said safety counter means comprises a counter which measures and stores an elapsed time of movement of said torch from its uppermost position to the actuating of the proximity switch and compares said elapsed time so shared with an elapsed time during a subsequent cycle so that if said proximity switch has failed to cause the rate of travel of said torch on said subsequent cycle to be slowed within the stored elapsed time, said counter will cause the rate of travel of said torch to be slowed.

6. A torch positioning apparatus as described in claim 4, wherein said safety counter means comprises a counter which measures and stores an elapsed time of movement of said torch from its uppermost position to the actuating of the proximity switch and compares said elapsed time so shared with an elapsed time during a subsequent cycle so that if said proximity switch has failed to cause the rate of travel of said torch on said subsequent cycle to be slowed within the stored elapsed time, said counter will cause the rate of travel of said torch to be slowed.

7. A torch positioning apparatus, comprising:

a. a torch means;

b. a electrically powered means of moving said torch means towards and away from a workpiece;

c. a sample and hold circuit which detects and stores a voltage input into said electrically powered means as said torch means moves towards a workpiece;

d. a amplifier circuit which sums a predetermined voltage to the stored voltage input value to produce a threshold voltage; and e. a comparator circuit which compares said threshold voltage to a voltage input to said electrically powered means so as to cause said electrically powered means to retract said torch means upon said threshold voltage being exceeded by the voltage input into said electrically powered means.

8. A torch positioning apparatus as described in claim 7, further comprising a proximity switch which detects when said torch has reached a predetermined height above said workpiece and which controls said electrically powered means so as to slow the rate of movement of said torch toward said workpiece.

9. A torch positioning apparatus as described in claim 8, further comprising a safety counter which slows the travel of said torch towards said workpiece after a predetermined time in case of failure of said means for detecting when said torch is near said workpiece.

10. A torch positioning apparatus as described in claim 9, wherein said safety counter means comprises a counter which measures and stores an elapsed time of movement of said torch from its uppermost position to the actuation of the proximity switch and compares that elapsed time so shared with an elapsed time during a subsequent cycle so that if said proximity switch has failed to cause the rate of travel of said torch on said subsequent cycle to be slowed within the stored elapsed time, said counter will cause the rate of travel of said torch to be slowed.

11. A torch positioning apparatus as described in claim 10, wherein said safety counter means comprises a counter which measures and stores an elapsed time of movement of said torch from its uppermost position to the actuation of the proximity switch and compares that elapsed time so shared with an elapsed time during a subsequent cycle so that if said proximity switch has failed to cause the rate of travel of said torch on said subsequent cycle to be slowed within the stored elapsed time, said counter will cause the rate of travel of said torch to be slowed.

* * * * *